(12) United States Patent
Lee et al.

(10) Patent No.: US 8,618,209 B2
(45) Date of Patent: Dec. 31, 2013

(54) POLYAMIDE RESIN COMPOSITION AND MOLDED PRODUCT USING THE SAME

(75) Inventors: Ywan-Hee Lee, Uiwang-si (KR);
Young-Seok Chang, Uiwang-si (KR);
Jin-Kyung Cho, Uiwang-si (KR);
Doo-Han Ha, Uiwang-si (KR);
Jin-Young Huh, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 13/330,726

(22) Filed: Dec. 20, 2011

(65) Prior Publication Data

US 2012/0157606 A1    Jun. 21, 2012

(30) Foreign Application Priority Data

Dec. 21, 2010    (KR) ........................ 10-2010-0131828

(51) Int. Cl.
*C08L 77/06*    (2006.01)
*C08K 7/14*    (2006.01)

(52) U.S. Cl.
USPC ........................................................ 524/538

(58) Field of Classification Search
USPC .................................................. 524/494, 538
See application file for complete search history.

(56) References Cited

U.S. PATENT DOCUMENTS

| | | |
|---|---|---|
| 8,309,643 B2 | 11/2012 | Thullen et al. |
| 8,476,354 B2 | 7/2013 | Topoulos |
| 2008/0167415 A1 | 7/2008 | Stoeppelmann et al. |
| 2010/0227122 A1* | 9/2010 | Kumazawa et al. .......... 428/156 |

FOREIGN PATENT DOCUMENTS

| | | | | |
|---|---|---|---|---|
| CN | 101104733 | | 1/2008 | |
| EP | 0826731 | * | 8/1997 | .............. C08L 77/00 |
| JP | 02-255764 A | | 10/1990 | |
| JP | 07-138475 A | | 5/1995 | |
| JP | 4441855 A | | 1/2010 | |
| JP | 2010-047666 | * | 3/2010 | .............. C08L 77/02 |
| KR | 10-2008-0063120 A | | 7/2008 | |
| KR | 10-2010-0071713 A | | 6/2010 | |
| WO | 2010/075351 A2 | | 7/2010 | |

OTHER PUBLICATIONS

Machine translation of JP 2010-047666. Mar. 2010.*
Greene, Joseph. Shrinkage Chapter 8. 2000.*
Fischer, Jerry. Handbook of Molded Part Shrinkage and Warpage. Norwich, NY. pp. 29-33. 2003.*
Search Report in counterpart Chinese Application No. 201110431607.1 dated Sep. 25, 2013, pp. 1-2.

* cited by examiner

*Primary Examiner* — John Uselding
(74) *Attorney, Agent, or Firm* — Additon, Higgins, Pendleton & Ashe, P.A.

(57) ABSTRACT

Disclosed are a polyamide resin composition that includes (A) a crystalline polyamide mixed resin including an aliphatic group and at least two different crystalline polyamide resins, (B) a non-crystalline polyamide resin including an aromatic group, and (C) a glass fiber, and a molded product manufacture using the same.

8 Claims, No Drawings

POLYAMIDE RESIN COMPOSITION AND MOLDED PRODUCT USING THE SAME

CROSS-REFERENCE TO RELATED APPLICATION

This application claims priority under 35 USC Section 119 to and the benefit of Korean Patent Application No. 10-2010-0131828 filed in the Korean Intellectual Property Office on Dec. 21, 2010, the entire disclosure of which is incorporated herein by reference.

FIELD OF THE INVENTION

This disclosure relates to a polyamide resin composition and a molded product using the same.

BACKGROUND OF THE INVENTION

A polyamide resin can be prepared by including an inorganic material such as glass fiber and the like to provide mechanical and thermal characteristics. Such a polyamide resin can be used to manufacture UTH (under the hood) parts of an auto. However, the inorganic material can cause stress differentials in a product due to anisotropy, which can deteriorate quality of the product.

SUMMARY

An exemplary embodiment provides a polyamide resin composition that can have an excellent balance of properties such as mechanical properties, heat resistance, and dimensional stability.

Another embodiment provides molded product manufactured using the polyamide resin composition.

According to one embodiment, provided is a polyamide resin composition that includes (A) about 20 wt % to about 80 wt % of a crystalline polyamide mixed resin including (A-1) a first crystalline polyamide resin having an aliphatic group and (A-2) a second crystalline polyamide resin having an aliphatic group; (B) about 1 wt % to about 30 wt % of a non-crystalline polyamide resin having an aromatic group; and (C) about 10 wt % to about 50 wt % of a glass fiber, wherein the first crystalline polyamide resin (A-1) and the second crystalline polyamide resin (A-2) are different from each other.

The first crystalline polyamide resin (A-1) and the second crystalline polyamide resin (A-2) may be different from each other. Examples of the first crystalline polyamide resin (A-1) and the second crystalline polyamide resin (A-2) include independently from one another, and without limitation, polyamide 6, polyamide 11, polyamide 12, polyamide 46, polyamide 66, polyamide 69, polyamide 610, polyamide 612, polyamide 6/610, polyamide 6/66, polyamide 6/12, polyphthalamide, polyarylamide, and the like, and combinations thereof.

The first crystalline polyamide resin (A-1) and the second crystalline polyamide resin (A-2) may be mixed at a weight ratio of about 1:3 to about 3:1.

Examples of the non-crystalline polyamide resin (B) may include without limitation polyamide 6T, polyamide 9T, polyamide 6I, polyamide MXD6, polyamide M5T, polyamide 6/6T, polyamide 66/6T, polyamide 66/6I, polyamide 6T/6I, polyamide 6T/12, polyamide 66/6T/6I, polyamide 6T/M5T, and the like, and combinations thereof.

The crystalline polyamide mixed resin (A) and the non-crystalline polyamide resin (B) may be mixed at a weight ratio of about 5:1 to about 15:1.

The glass fiber (C) may include (C-1) a glass fiber with a circular cross-section and (C-2) a glass fiber with an oval cross-section.

The glass fiber with a circular cross-section (C-1) and the glass fiber with an oval cross-section (C-2) may be mixed at a weight ratio ranging from about 1:4 to about 4:1.

The polyamide resin composition may have a TD (Transverse Direction) shrinkage ratio of less than about 0.90%.

According to another embodiment, a molded product manufactured using the polyamide resin composition is provided.

Hereinafter, further embodiments will be described in detail.

The polyamide resin composition may have an excellent balance of properties such as mechanical properties, heat resistance, and dimensional stability and thus, may be used in various molded products, for example, a plastic exterior product such as electronic parts, UTH (under the hood) parts of an auto, and the like.

DETAILED DESCRIPTION

The present invention will be described more fully hereinafter in the following detailed description of the invention, in which some but not all embodiments of the invention are described. Indeed, this invention may be embodied in many different forms and should not be construed as limited to the embodiments set forth herein; rather, these embodiments are provided so that this disclosure will satisfy applicable legal requirements.

According to one embodiment, provided is a polyamide resin composition including (A) a crystalline polyamide mixed resin including at least two different crystalline polyamide resins, (B) a non-crystalline polyamide resin, and (C) a glass fiber.

Exemplary components included in the polyamide resin composition according to one embodiment will hereinafter be described in detail.

(A) Crystalline Polyamide Mixed Resin

The crystalline polyamide mixed resin may be prepared by mixing at least two different crystalline polyamide resins.

The crystalline polyamide mixed resin may in particular include a first crystalline polyamide resin and a second crystalline polyamide resin differing from the first crystalline polyamide resin. The first and second crystalline polyamide resins are all polyamide compounds having an aliphatic group in their main chain.

The first crystalline polyamide resin and the second crystalline polyamide resin may be different from each other. Examples of the first crystalline polyamide resin and the second crystalline polyamide resin may include without limitation polyamide 6, polyamide 11, polyamide 12, polyamide 46, polyamide 66, polyamide 69, polyamide 610, polyamide 612, polyamide 6/610, polyamide 6/66, polyamide 6/12, polyphthalamide, polyarylamide (such as the reaction product of adipic acid and m-xylenediamine), and the like, and combinations thereof. In one embodiment, as the crystalline polyamide mixed resin, a mixture of polyamide 6 and polyamide 66 may be used. The mixture of polyamide 6 and polyamide 66 may improve formability and appearance and decrease manufacturing costs.

The first and second crystalline polyamide resins may be mixed at a weight ratio of about 1:3 to about 3:1, for example at a weight ratio of about 1:2 to 2:1.

In some embodiments, the mixture of the first and second crystalline polyamide resins may include the first crystalline polyamide resin in an amount of about 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, or 75 wt %. Further, according to some embodiments of the present invention, the amount of the first crystalline polyamide resin can be in a range from about any of the foregoing amounts to about any other of the foregoing amounts.

In some embodiments, the mixture of the first and second crystalline polyamide resins may include the second crystalline polyamide resin in an amount of about 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, or 75 wt %. Further, according to some embodiments of the present invention, the amount of the second crystalline polyamide resin can be in a range from about any of the foregoing amounts to about any other of the foregoing amounts.

When the first and second crystalline polyamide resins are mixed in amounts within the above range, a polyamide resin composition may have an excellent balance of properties such as mechanical properties, heat resistance, and dimensional stability.

The first and second crystalline polyamide resins have a crystallinity of about 30% or more, for example about 30% to about 40%, respectively.

The polyamide resin composition may include the crystalline polyamide mixed resins (A) in an amount of about 20 wt % to about 80 wt %, for example about 30 wt % to about 60 wt %, based on the total weight of the polyamide resin composition. In some embodiments, the polyamide resin composition may include the crystalline polyamide mixed resins (A) in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the crystalline polyamide mixed resins (A) can be in a range from about any of the foregoing amounts to about any other of the foregoing amounts.

When the polyamide resin composition includes the crystalline polyamide mixed resins in an amount within the above range, a polyamide resin composition may have an excellent balance of properties such as mechanical properties, heat resistance, dimensional stability, and formability.

(B) Non-Crystalline Polyamide Resin

The non-crystalline polyamide resin is a polyamide compound having a melting point of about 180° C. or higher and an aromatic group in its main chain.

In exemplary embodiments, the non-crystalline polyamide resin may be prepared by condensation-polymerizing dicarboxylic acid including about 10 mol % to about 100 mol % of aromatic dicarboxylic acid with aliphatic diamine, alicyclic diamine, or a combination thereof.

Examples of the aromatic dicarboxylic acid may include without limitation terephthalic acid (TPA) represented by the following formula 1a, isophthalic acid (IPA) represented by the following formula 1b, or a combination thereof.

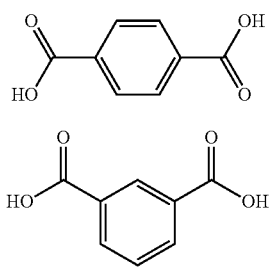

[Chemical Formula 1a]

[Chemical Formula 1b]

The aliphatic or alicyclic diamine may be a C4 to C20 diamine compound.

Examples of the non-crystalline polyamide resin may include polyamide 6T prepared by condensation-polymerizing hexamethylene diamine with terephthalic acid. The polyamide 6T may include a repeating unit represented by the following formula 2.

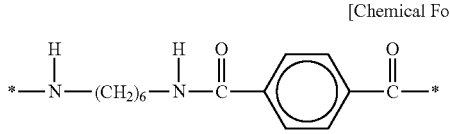

[Chemical Formula 2]

The non-crystalline polyamide resin may include a copolymer of a polyamide compound having an aromatic group in its main chain and a polyamide compound having an aliphatic group in its main chain.

Examples of the non-crystalline polyamide resin may include without limitation polyamide 6T, polyamide 9T, polyamide 6I, polyamide MXD6, polyamide M5T, polyamide 6/6T, polyamide 66/6T, polyamide 66/6I, polyamide 6T/6I, polyamide 6T/12, polyamide 66/6T/6I, polyamide 6T/M5T, and the like, and combinations thereof.

The non-crystalline polyamide resin has a crystallinity of about 5% or less, for example about 0% to about 5%.

The polyamide resin composition may include the non-crystalline polyamide resin in an amount of about 1 wt % to about 30 wt %, for example about 8 wt % to about 15 wt %, based on the total weight of the polyamide resin composition. In some embodiments, the polyamide resin composition may include the non-crystalline polyamide resin in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments of the present invention, the amount of the non-crystalline polyamide resin can be in a range from about any of the foregoing amounts to about any other of the foregoing amounts.

When the polyamide resin composition includes the non-crystalline polyamide resin in an amount within the above range, a polyamide resin composition may have improved dimensional stability.

The crystalline polyamide mixed resin (A) and the non-crystalline polyamide resin (B) may be mixed at a weight ratio of about 5:1 to about 15:1, for example about 6:1 to about 13:1.

In some embodiments, the mixture of the crystalline polyamide mixed resin (A) and the non-crystalline polyamide resin (B) may include the crystalline polyamide mixed resin (A) in an amount of about 83, 84, 85, 86, 87, 88, 89, 90, 91, 92, 93, or 94 wt %. Further, according to some embodiments of the present invention, the amount of crystalline polyamide mixed resin (A) can be in a range from about any of the foregoing amounts to about any other of the foregoing amounts.

In some embodiments, the mixture of the crystalline polyamide mixed resin (A) and the non-crystalline polyamide resin (B) may include the non-crystalline polyamide resin (B) in an amount of about 6, 7, 8, 9, 10, 11, 12, 13, 14, 15, 16, or 17 wt %. Further, according to some embodiments of the present invention, the amount of non-crystalline polyamide resin (B) can be in a range from about any of the foregoing amounts to about any other of the foregoing amounts.

When the crystalline polyamide mixed resins are mixed in an amount within the above ratio range, a polyamide resin composition may have an excellent balance of properties such as mechanical properties, heat resistance, and dimensional stability.

(C) Glass Fiber

The glass fiber may have a diameter ranging from about 5 to about 30 μm and a length ranging from 1.5 to about 13 mm. When the glass fiber has a diameter and a length within the above range, the glass fiber may be easily fed into an extruder and can provide excellent mechanical properties.

The glass fiber may have a circular cross-section and an oval cross-section.

The glass fiber with a circular cross-section may have an aspect ratio of about 1. The aspect ratio is defined as a ratio of the longest diameter relative to the shortest diameter in the cross-section.

The glass fiber with an oval cross-section may have an aspect ratio of more than about 1. For example, the glass fiber may have an aspect ratio of about 1.5 or more, as another example, an aspect ratio ranging from about 2 to about 8, and as another example, an aspect ratio ranging from about 2 to about 6.

The glass fibers with circular and oval cross-sections may be mixed at a weight ratio ranging from about 1:4 to about 4:1, for example about 1:2 to about 2:1.

In some embodiments, the mixture of glass fibers with circular and oval cross-sections may include glass fibers with a circular cross-section in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the glass fibers with a circular cross-section can be in a range from about any of the foregoing amounts to about any other of the foregoing amounts.

In some embodiments, the mixture of glass fibers with circular and oval cross-sections may include glass fibers with an oval cross-section in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the glass fibers with an oval cross-section can be in a range from about any of the foregoing amounts to about any other of the foregoing amounts.

When the glass fibers are mixed in an amount within the above ratio range, a polyamide resin composition may have improved dimensional stability.

The glass fiber may be coated with a predetermined material on the surface to prevent a reaction between a crystalline polyamide mixed resin with a non-crystalline polyamide resin and to improve a moisturizing degree.

This coating material may change overall fluidity, mechanical properties, and the like of a polyamide resin composition. The kinds of the coating material coated on the surface of the glass fiber are well known to a person of ordinary skill in the art.

The polyamide resin composition may include the glass fiber in an amount of about 10 to about 50 wt %, for example about 20 to about 40 wt %, based on the total weight of the polyamide resin composition. In some embodiments, the polyamide resin composition may include the glass fiber in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the glass fiber can be in a range from about any of the foregoing amounts to about any other of the foregoing amounts.

When the polyamide resin composition includes the glass fiber in an amount within the above range, a polyamide resin composition may have an excellent balance of properties such as mechanical properties, heat resistance, and dimensional stability.

(D) Other Additive(s)

The polyamide resin composition may further include one or more additives, Examples of additives include without limitation antibacterial agents, heat stabilizers, antioxidants, release agents, light stabilizers, surfactants, coupling agents, plasticizers, admixtures, colorants, stabilizers, lubricants, antistatic agents, coloring aids, flame proofing agents, weather-resistance agents, ultraviolet (UV) absorbers, ultraviolet (UV) blocking agents, nucleating agents, adhesion aids, adhesives, and the like, and combinations thereof.

Examples of the antioxidant may include without limitation phenol antioxidants, phosphate antioxidants, thioether antioxidants, amine antioxidants, and the like, and combinations thereof.

Examples of the release agent may include without limitation fluorine-containing polymers, silicon oils, stearic metal salts, montanic metal salts, montanic ester waxes, polyethylene waxes, and the like, and combinations thereof.

Examples of the weather-resistance agent may include without limitation benzophenone-type weather-resistance agents, amine-type weather-resistance agents, and the like, and combinations thereof.

Examples of the colorant may include without limitation dyes, pigments, and the like, and combinations thereof.

Examples of the ultraviolet (UV) ray blocking agent may include without limitation titanium oxide ($TiO_2$), carbon black, and the like, and combinations thereof.

Examples of the nucleating agent may include without limitation talc, clay, and the like, and combinations thereof.

The additive may be included in a predetermined amount as long as it does not deteriorate the properties of the polyamide resin composition. In one embodiment, the additive may be included in an amount of about 40 parts by weight or less, for example about 0.1 to about 30 parts by weight based on about 100 parts by weight of the polyamide resin composition.

The polyamide resin composition may be prepared using any well-known method of preparing a thermoplastic resin composition. For example, each component according to one embodiment can be simultaneously mixed with one or more optional additives. The mixture can be melt-extruded and prepared into pellets.

The polyamide resin composition may have a TD (Transverse Direction) shrinkage ratio of less than about 0.90%, for example about 0.80 to about 0.88%. The TD shrinkage ratio is measured by using a specimen prepared of the polyamide resin composition and injecting it in a 10 oz injection machine while maintaining a 6"×6" and ⅛"-thick film gate mold at 80° C. and then, allowing it to stand in a constant temperature/humidity room for 24 hours at 23° C. with moisture of 50% without any external pressure.

According to another embodiment, a molded product manufactured using the aforementioned polyamide resin composition is provided. The polyamide resin composition can be used to manufacture a molded product using various processes such as injection molding, blow molding, extrusion molding, thermal molding, and the like. In exemplary embodiments, the polyamide resin composition may be used in the production of a molded product requiring mechanical properties, heat resistance, and dimensional stability, for example, a plastic exterior product such as electronic parts, an auto UTH (under the hood) part, and the like.

The following examples illustrate this disclosure in more detail. However, it is understood that this disclosure is not limited by these examples.

A polyamide resin composition according to one embodiment includes each component as follows.

(A) Crystalline Polyamide (PA) Mixed Resin
(A-1) First Crystalline Polyamide (PA) Resin
A polyamide 6, TP-4210 made by Zigsheng Industrial Co., Ltd., is used
(A-2) Second Crystalline Polyamide (PA) Resin
A polyamide 66, Leona 1200 made by Asahi-Kasei Inc., is used.
(B) Non-Crystalline Polyamide (PA) Resin
Selar® PA 3426 made by Dupont Co. is used.
(C) Glass Fiber
(C-1) CS321-EC10-3 made by KCC is used as a glass fiber with a length of about 3 mm, a diameter of about 13 μm and a cross-section aspect ratio of about 1.
(C-2) CSG 3PA-820 made by Nitto Boseki Co. Ltd. is used as a glass fiber with a cross-section aspect ratio of about 4 (the longest diameter of about 28 μm, the shortest diameter of about 7 μm) and a length of about 3 mm.

Examples 1 to 5 and Comparative Examples 1 to 9

Each polyamide resin composition according to Examples 1 to 5 and Comparative Examples 1 to 9 is prepared using the aforementioned components in the amounts set forth in the following Table 1.

The components are mixed to provide the compositions set forth in the following Table 1, extruded in a general twin-screw extruder at 220° C., and then, shaped into a pellet.

Experimental Example

An ASTM dumb-bell specimen is prepared by drying the pellet at 80° C. for 2 hours and then, injecting and molding it by using a 6 oz injection molding machine and setting a cylinder temperature at 210° C. and a molding temperature at 60° C. The properties of the specimen are measured as follows. The results are provided in the following Table 1.

(1) Tensile strength: measured in accordance with ASTM D638.
(2) Flexural strength: measured in accordance with ASTM D790.
(3) Flexural modulus: measured in accordance with ASTM D790.
(4) Thermal distortion temperature (HDT): measured in accordance with ASTM D648.
(5) TD (Transverse Direction) shrinkage ratio: The polyamide resin compositions are injected in a 10 oz injection machine while maintaining a 6"×6" and 1/8"-thick film gate mold at 80° C. and then, allowing the resultant product to stand in a constant temperature/humidity room for 24 hours at 23° C. with moisture of 50% without any external pressure. The shrinkage ratios of the resulting specimens are measured and reported as a percent (%) unit.

TABLE 1

| | | Example | | | | | Comparative Example | | |
|---|---|---|---|---|---|---|---|---|---|
| | | 1 | 2 | 3 | 4 | 5 | 1 | 2 | 3 |
| (A) crystalline PA mixed resin | (A-1) first crystalline PA resin (wt %) | 30 | 30 | 20 | 30 | 35 | 40 | 40 | 40 |
| | (A-2) second crystalline PA resin (wt %) | 35 | 35 | 45 | 30 | 25 | 50 | 40 | 30 |
| (B) non-crystalline PA resin (wt %) | | 5 | 5 | 5 | 5 | 10 | 0 | 0 | 0 |
| (C) glass fiber | (C-1, wt %) | 20 | 10 | 20 | 20 | 20 | 10 | 20 | 30 |
| | (C-2, wt %) | 10 | 20 | 10 | 10 | 10 | 0 | 0 | 0 |
| tensile strength (kgf/cm$^2$) | | 1280 | 1420 | 1320 | 1200 | 1190 | 700 | 900 | 1200 |
| flexural strength (kgf/cm$^2$) | | 1680 | 1780 | 1730 | 1500 | 1490 | 900 | 1200 | 1500 |
| flexural modulus (kgf/cm$^2$) | | 63000 | 66000 | 65000 | 70000 | 70000 | 30000 | 50000 | 70000 |
| thermal distortion temperature (° C.) | | 188 | 190 | 192 | 190 | 187 | 120 | 150 | 180 |
| TD shrinkage ratio (%) | | 0.84 | 0.79 | 0.84 | 0.82 | 0.80 | 1.02 | 0.99 | 0.97 |

| | | Comparative Example | | | | | |
|---|---|---|---|---|---|---|---|
| | | 4 | 5 | 6 | 7 | 8 | 9 |
| (A) crystalline PA mixed resin | (A-1) first crystalline PA resin (wt %) | 30 | 20 | 70 | 0 | 50 | 65 |
| | (A-2) second crystalline PA | 30 | 30 | 0 | 70 | 40 | 0 |

TABLE 1-continued

|  |  |  |  |  |  |  |  |
|---|---|---|---|---|---|---|---|
| resin (wt %) | | | | | | | |
| (B) non-crystalline PA resin (wt %) | | 0 | 0 | 0 | 0 | 10 | 50 |
| (C) glass fiber | (C-1, wt %) | 40 | 50 | 20 | 20 | 0 | 20 |
|  | (C-2, wt %) | 0 | 0 | 10 | 10 | 0 | 10 |
| tensile strength (kgf/cm²) | | 1500 | 1800 | 1100 | 1400 | 500 | 1000 |
| flexural strength (kgf/cm²) | | 1800 | 2100 | 1400 | 1800 | 800 | 1150 |
| flexural modulus (kgf/cm²) | | 100000 | 130000 | 600000 | 72000 | 30000 | 58000 |
| thermal distortion temperature (° C.) | | 220 | 250 | 180 | 200 | 95 | 185 |
| TD shrinkage ratio (%) | | 0.93 | 0.92 | 0.95 | 0.92 | 0.5 | 0.86 |

Referring to Table 1, Examples 1 to 5 including crystalline polyamide mixed resin including at least two different crystalline polyamide resins, a non-crystalline polyamide resin, and a glass fiber exhibit an excellent balance of mechanical properties, heat resistance and dimensional stability, as compared with Comparative Example 6, 7, and 9 including a crystalline polyamide resin, Comparative Examples 1 to 7 including no non-crystalline polyamide resin, and Comparative Example 8 including no glass fiber.

In particular, Examples 1 to 5 including a mixture of first and second crystalline polyamide resins in an appropriate ratio exhibit an excellent balance of mechanical properties, heat resistance, and dimensional stability. In addition, when a crystalline polyamide mixed resin including at least two different crystalline polyamide resins is mixed with a non-crystalline polyamide resin in an appropriate ratio to prepare a polyamide resin composition, the polyamide resin composition can exhibit an excellent balance of mechanical properties, heat resistance, and dimensional stability. In addition, when two different glass fibers are mixed in an appropriate ratio to prepare a polyamide resin composition, the polyamide resin composition can exhibit excellent dimensional stability.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A polyamide resin composition consisting essentially of:
   (A) about 20 wt % to about 80 wt % of a crystalline polyamide mixed resin including (A-1) a first crystalline polyamide resin having an aliphatic group and (A-2) a second crystalline polyamide resin having an aliphatic group;
   (B) about 1 wt % to about 30 wt % of a non-crystalline polyamide resin having an aromatic group; and
   (C) about 10 wt % to about 30 wt % of a glass fiber, wherein the glass fiber (C) includes (C-1) a glass fiber with a circular cross-section and (C-2) a glass fiber with an oval cross-section,
   wherein the first crystalline polyamide resin (A-1) and the second crystalline polyamide resin (A-2) are different from each other.

2. The polyamide resin composition of claim 1, wherein the first crystalline polyamide resin (A-1) and the second crystalline polyamide resin (A-2) are different from each other, and are independently polyamide 6, polyamide 11, polyamide 12, polyamide 46, polyamide 66, polyamide 69, polyamide 610, polyamide 612, polyamide 6/610, polyamide 6/66, polyamide 6/12, polyphthalamide, polyarylamide, or a combination thereof.

3. The polyamide resin composition of claim 1, wherein the first crystalline polyamide resin (A-1) and the second crystalline polyamide resin (A-2) are mixed at a weight ratio of about 1:3 to about 3:1.

4. The polyamide resin composition of claim 1, wherein the non-crystalline polyamide resin (B) are polyamide 6T, polyamide 9T, polyamide 6I, polyamide MXD6, polyamide M5T, polyamide 6/6T, polyamide 66/6T, polyamide 66/6I, polyamide 6T/6I, polyamide 6T/12, polyamide 66/6T/6I, polyamide 6T/M5T, or a combination thereof.

5. The polyamide resin composition of claim 1, wherein the crystalline polyamide mixed resin (A) and the non-crystalline polyamide resin (B) are mixed at a weight ratio of about 5:1 to about 15:1.

6. The polyamide resin composition of claim 1, wherein the glass fiber with a circular cross section (C-1) and the glass fiber with an oval cross-section of (C-2) are mixed at a weight ratio of about 1:4 to about 4:1.

7. The polyamide resin composition of claim 1, wherein the polyamide resin composition has a Transverse Direction shrinkage ratio of less than about 0.90%.

8. A molded product manufactured by using the polyamide resin composition according to claim 1.

* * * * *